United States Patent [19]

Baer et al.

[11] Patent Number: 5,437,552
[45] Date of Patent: Aug. 1, 1995

[54] INTERACTIVE AUDIO-VISUAL WORK

[75] Inventors: Ralph H. Baer, Manchester, N.H.; Philip E. Orbanes, Topsfield, Mass.

[73] Assignee: Western Publishing Co., Inc., Racine, Wis.

[21] Appl. No.: 106,422

[22] Filed: Aug. 13, 1994

[51] Int. Cl.⁶ .............................................. G09B 5/00
[52] U.S. Cl. .................... 434/317; 434/306; 434/322; 434/319
[58] Field of Search .............. 434/308, 309, 317, 322, 434/327, 156, 157, 167, 169, 185, 319–321; 364/410, 419.01, 419.02–419.07

[56] References Cited

U.S. PATENT DOCUMENTS

| | | |
|---|---|---|
| 2,369,572 | 2/1945 | Kallmann . |
| 2,650,097 | 8/1953 | Erdos . |
| 3,529,832 | 9/1970 | Goetz . |
| 3,871,112 | 3/1975 | Licitis . |
| 4,394,018 | 7/1983 | Orbanes et al. . |
| 4,648,086 | 3/1987 | Koike . |
| 4,703,573 | 11/1987 | Montgomery et al. . |
| 4,809,246 | 2/1989 | Jeng . |
| 4,884,974 | 12/1989 | DeSmet .................... 434/317 |
| 4,990,092 | 2/1991 | Cummings ................ 434/317 |
| 5,057,051 | 10/1991 | Babicz . |
| 5,145,447 | 9/1992 | Goldfarb . |
| 5,290,190 | 3/1994 | McClanahan ............. 434/317 |
| 5,356,296 | 10/1994 | Pierce et al. .............. 434/317 |

Primary Examiner—Richard J. Apley
Assistant Examiner—Glenn E. Richman
Attorney, Agent, or Firm—Amster, Rothstein & Ebenstein

[57] ABSTRACT

Apparatus for use in conjunction with a book containing intermixed text and symbols, includes a randomly accessible sound storage-and-playback memory having addressable storage locations, and a plurality of actuatable selectors, each selector being associated with a respective symbol corresponding to a symbol in the book. A switch selects between a recording mode of operation and a playback mode of operation. A microprocessor controls recording at respective addressable storage locations in the memory respective sounds produced by the user, the recorder being active during the selected recording mode of operation. The microprocessor controls the playback from the memory of a respective recorded sound, the playback means being actuated by the microprocessor upon actuation of a respective one of the selectors during the selected playback mode of operation.

30 Claims, 10 Drawing Sheets

TO FIG. 3B

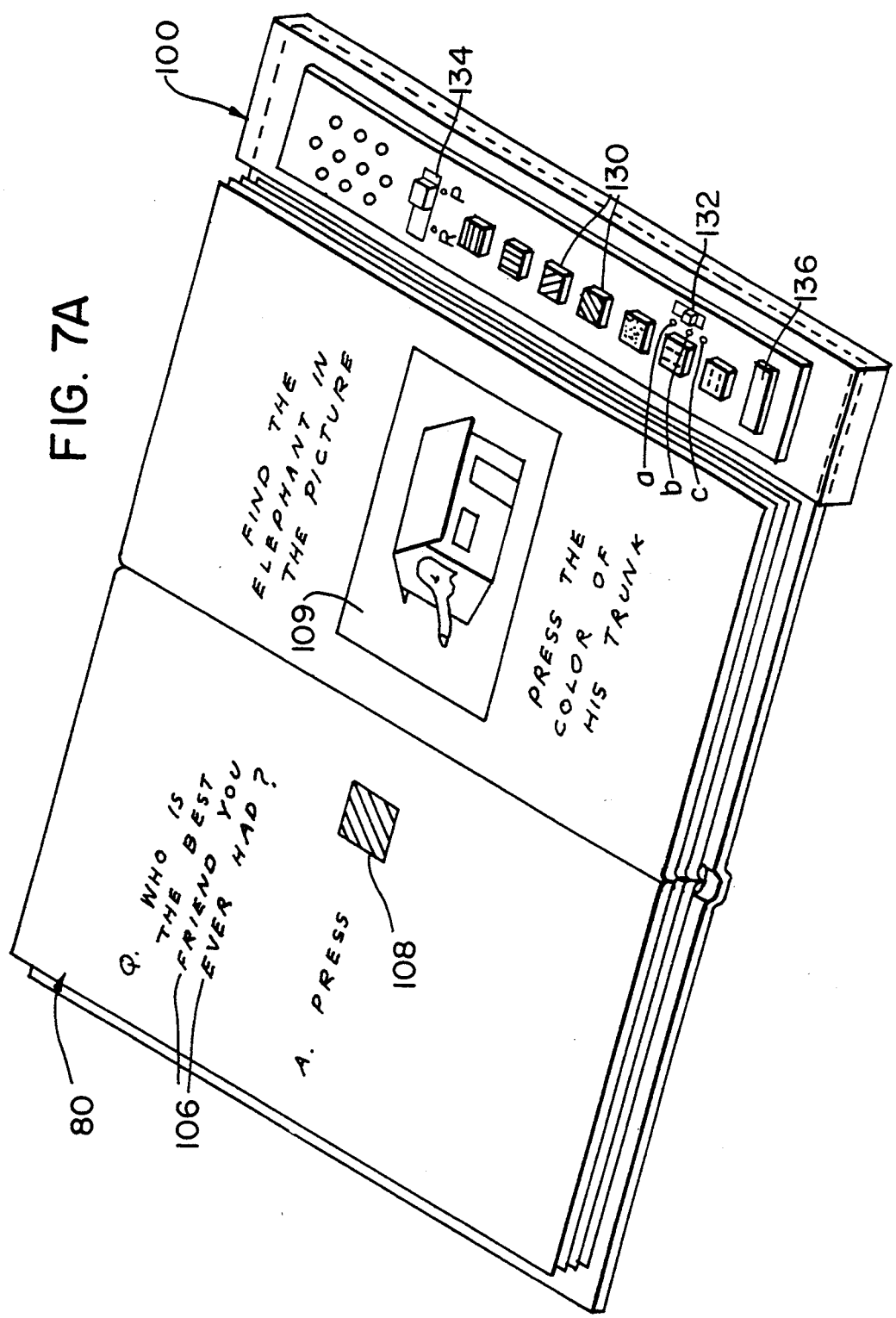

INTERACTIVE AUDIO-VISUAL WORK

BACKGROUND OF THE INVENTION

The present invention relates to an interactive audio-visual work, and more particularly to such apparatus for use in conjunction with a book having intermixed text and symbols.

In the field of interactive children's books which are equipped with supplementary electronic devices, the combination of a book and an associated prerecorded audio tape or audio record has been the earliest and most popular product. Such systems have been successful children's products for over a decade. The objective of these products is to introduce young children to reading and to encourage older children to improve their reading skills, while employing some form of interactivity to make achieving these reading-skill goals both more pleasurable and self-motivating.

More recently, children's books have become available which contain integral electronic devices capable of producing sounds that had been stored in a digital memory within the device during the manufacturing process, either as digitally recorded or synthesized sound. Examples of such books are the SIGHT-N-SOUND books published by Western Publishing and widely available in toy stores and at other merchandisers in the United States and elsewhere. In these books, an electronic device is attached to the back cover. This device allows the reader to press any one of several touchbutton switch areas located on the device, which in turn results in the production of a particular prestored sound, such as that of a human voice, an animal sound, musical instrument sounds and the like. When the child reads the book or has the book read to him or her, graphics or colored indications within the text direct the reader to press similarly identified or colored touchbuttons on the device; thereby to reproduce an appropriate, prestored sound to enliven and otherwise enhance the process of reading the book. This specific product has had substantial commercial success as a result of its realistic reproduction of the stored sounds and its relatively low cost, due to the use of low-cost speech synthesizer integrated circuits with low data-storage requirements per second of sound delivered.

None of the aforementioned electronically-enhanced interactive children's books have as yet had the capability to allow the recording of the reader's voice or reader's selection of these recorded sounds for later playback during the reading of a book, let alone the capability of varying the pitch of the sound being played back or randomizing the response, despite the well-recognized fact that children like to hear their own voices.

Accordingly, it is an object of the present invention to provide apparatus for use in conjunction with a book which enables sounds produced by the user (such as his voice) to be recorded prior to reading the book so that the recorded sound segments can later be called up selectively and played back during the reading of the book.

Another object is to provide such apparatus herein the previously recorded sounds stored in the apparatus may be altered in pitch or volume when played back.

A further object is to provide such apparatus wherein the previously recorded sounds stored in the apparatus may be played back in a different order from that in which they were recorded and stored.

It is also an object of the present invention to provide such apparatus which enables the previously recorded sounds stored in the apparatus according to certain logic rules to be played back in response to different logic rules.

SUMMARY OF THE INVENTION

It has now been found that the above and related objects of the present invention are obtained in apparatus according to the present invention for use in conjunction with a book containing intermixed text and symbols. The apparatus comprises a microprocessor (typically with ROM) and a randomly accessible sound storage-and-playback memory having addressable storage locations. Disposed on the apparatus are a plurality of actuatable selectors, each selector being associated with a respective symbol corresponding to a symbol in the book, and means for selecting between a recording mode of operation and a playback mode of operation. Also provided are means for recording at respective addressable storage locations in the memory respective sounds produced by the user, the recording means being active during the selected recording mode of operation, and means for playback from the memory of a respective recorded sound, the playback means being active upon actuation of a respective one of the selectors during the selected playback mode of operation.

In a preferred embodiment, the recording means is active, upon actuation of a respective one of the selectors during the selected recording mode of operation, for recording at a respective memory location the respective sound produced by the user. The playback means, upon actuation of a respective one of the selectors in the selected playback mode of operation, plays back the sound recorded in a respective memory location. The respective recorded sound played back upon actuation of the respective one selector in the selected playback mode of operation is generally the same respective sound previously recorded upon actuation of the respective one selector in the selected recording mode of operation.

More particularly, the recording means, upon actuation of a respective one of the selectors in the selected recording mode of operation, records the sound produced by the user in a respective memory location, and the playback means, upon actuation of a respective one of the selectors in the selected playback mode of operation, plays back the sound recorded in a respective memory location. Optionally, the playback means, upon actuation of respective one of the selectors in the selected playback mode of operation, plays back the sound recorded in a randomly selected memory location. Thus the apparatus may additionally include means (typically in the microprocessor) for determining according to a first algorithm the respective memory location where the sound produced during actuation of a given one of the selectors is recorded in the selected recording mode of operation, and according to a second algorithm the respective memory location from which the sound will be played back in the selected playback mode of operation upon actuation of the given one of the selectors.

The first and second algorithms are ordinarily the same, but optionally the apparatus additionally includes either an actuatable randomizing switch which, when actuated, causes the second algorithm to differ from the first algorithm and to randomly associate respective memory locations with respective selectors, or an actuatable randomizing switch which, when actuated, causes the playback means to playback a randomly selected respective recorded sound from the memory.

The respective sounds remain recorded in the respective memory locations until new sounds are recorded thereover in the selected recording mode of operation, thereby to enable multiple re-readings of the same text with the same sounds being produced in the selected playback mode of operation.

The apparatus may additionally include an actuatable frequency modifying switch which, when actuated, modifies the frequency (pitch) of the sound played back by the playback means so that it differs in frequency (pitch) from the sound recorded in the memory. The frequency modifying switch is typically user-actuatable. Alternatively, frequency modification may take place under program control.

The apparatus may further include means for altering the volume level of selected sounds during playback of sounds recorded in the memory, the means being under program control.

The apparatus may further include ROM-stored rules for altering the relationships between selectors and selected stored sounds. Specific ones of these rules may be invoked by a press of one of the selectors, as directed by text in the book at the beginning. Such a selection will hereafter be referred to as a "functional code" entry.

In a prepared embodiment, the apparatus additionally includes means for receiving functional codes so that the microprocessor operates according to at least one of a plurality of functional algorithms stored in the microprocessor according to the functional code received. The microprocessor may interpret as a functional code actuation of predetermined ones of the selectors during the selected recording mode of operation.

The algorithms may cause a change in the pitch or volume of the playedback sounds. The algorithms may cause specific ones of the memory locations to be addressed sequentially during the selected playback mode of operation, thereby to concatenate playedback sounds from the specific memory locations. Finally, the algorithms may control the relationship between the selectors and the respective memory locations during the selected playback mode of operation.

The present invention further encompasses in combination, the apparatus and a children's reading book, a game book, or a puzzle book, either with or without an external ROM unit and/or an external device operating under control of the apparatus.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIG. 7A is an isometric sketch of the apparatus of the present invention used in connection with a game book.

DETAILED DESCRIPTION OF THE PREFERRED EMBODIMENTS

Figure 1:
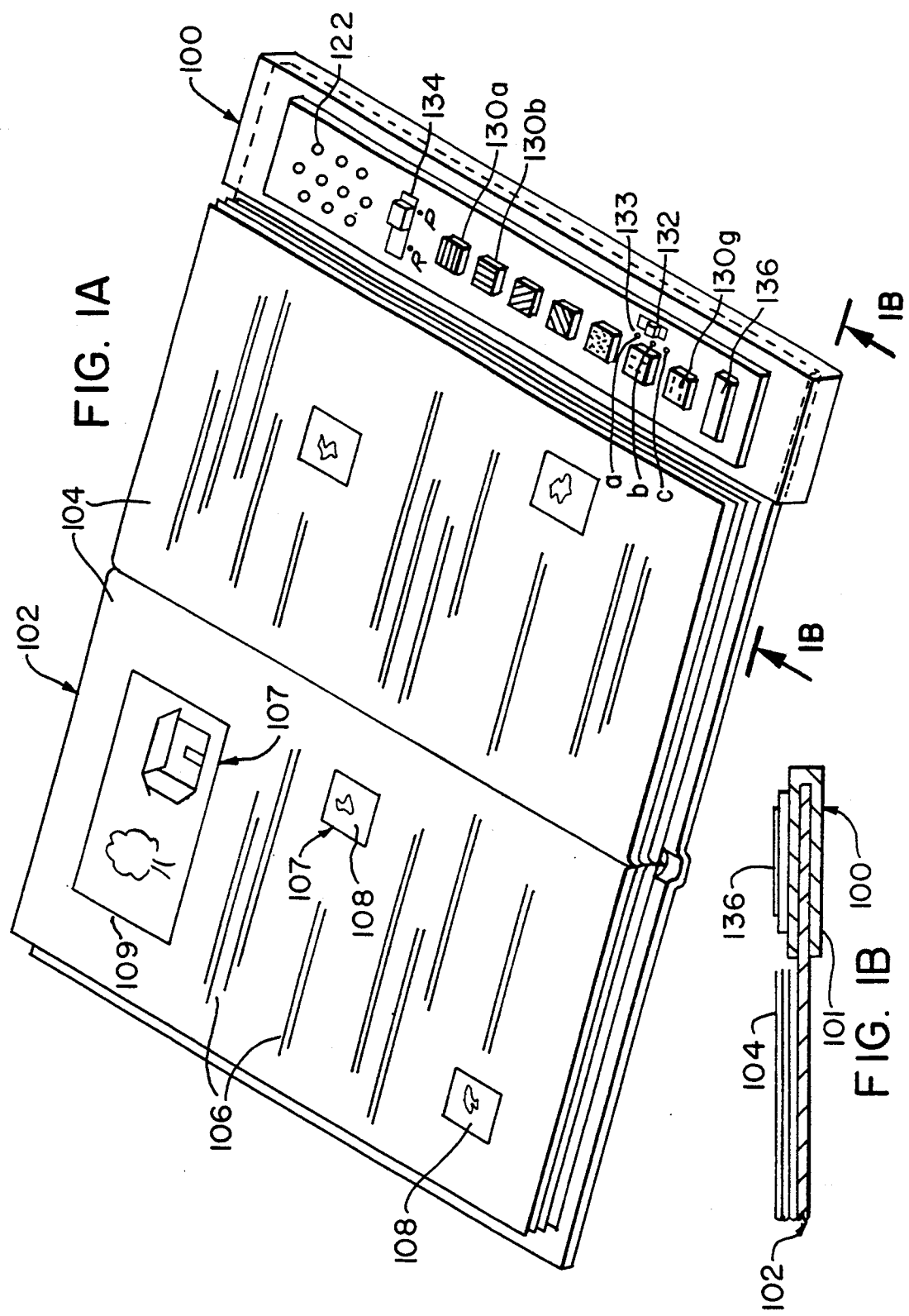
FIG. 1A is an isometric view of apparatus according to the present invention.
FIG. 1B is an end elevational view thereof taken along the line 1B—1B of FIG. 1A.

For the purposes of the present invention, the term "sounds produced by the user" will encompass not only voice and other sounds which are in fact produced by the user, but also voices and sounds produced by others or naturally occurring, but selected by the user for inclusion as one of the selectable recorded sounds. Other sounds, such as handclapping, fingertapping, music from a TV set, radio or other sources may also be stored as selectable sounds.

Referring now to the drawing, and in particular to FIGS. 1A and 1B thereof, therein illustrated is an apparatus according to the present invention, generally designated by the referenced numeral 100. The apparatus 100 defines along one edge thereof a slot 101 for receipt therein of an edge of a book cover. The apparatus 100 is used in conjunction with a children's reading book 102 containing pages 104, preferably having printed thereon both text 106 and symbols 107 intermixed. The symbols 107 may be either large symbols 109 (such as pictures or illustrations) or smaller symbols 108 actually contained within a line of text 106. Especially in an apparatus for use by the very young, the symbols may simply be colors.

While the apparatus 100 is illustrated as attached to the right back cover of book 102 so that the cover edge alone is received in slot 101 and the remainder of the apparatus 100 projects outwardly of the pages 104, clearly other relative dispositions between the book 102 and the apparatus 100 may be employed. For example, the apparatus 100 may receive the bottom edge of the back cover and be disposed substantially below the book 102. The apparatus may extend behind the entire book, if desired, rather than just an edge thereof.

As illustrated, the book 102 is releasably received within slot 101 of apparatus 101 and may be removed therefrom so that the same apparatus 100 may be used in conjunction with a multiplicity of different books at different times. Alternatively, however, the book 102 and apparatus 100 may be non-releasably fastened together.

The apparatus 100 includes therewithin a microprocessor 1 (IC 1), preferably with ROM, and a randomly accessible sound storage-and-playback device 2 (IC 2) having addressable memory storage locations. The apparatus further includes on its upper face a grill 122, behind which are disposed a microphone 10 and a loudspeaker 15, the former being used to record the sounds produced by the user (e.g., his voice) and the latter being used to playback the recorded sounds (e.g., the voice of the user).

The upper surface of the apparatus 100 additionally defines a plurality of actuatable selectors 130a, 130b, . . . 130g. While the selectors are illustrated as seven touchbutton switches SW-n where n=1, 2 . . . 7, this is only by way of example. A lesser or greater number of selectors 130 may be provided, and the selectors may be in non-pushbutton form, such as a membrane switch matrix. As an alternative example, a rotary switch having an appropriate number of detented stops may be provided and surrounded by printed symbols so that the user has only to rotate the knob or dial of the rotary switch until a pointer thereon is aligned with an appropriate symbol. The selectors 130a–130g control corresponding microswitches 3a–3g of the electrical circuit of apparatus 100 illustrated in FIG. 2. Thus the selectors 130 provide the user with a manual input capability during all operating modes of the electronic unit—i.e., during the recording and playback modes as well as during the code selection mode, all to be described hereinafter.

Additionally there are two further switches, slide switch 134 and touchbutton switch 136, representative of functional input switches that may be used for such functions as manually selecting the mode of operation of the system or randomizing the relationship between touchbuttons and stored phrases. In the basic embodiment of the present invention illustrated in FIG. 1, record/playback slide switch 134 (hereinafter "record switch") acts as a means for selecting between a recording mode of operation R and a playback mode of operation P for the apparatus, each of these modes R, P to be described hereinafter in further detail. Record switch 134 is switch 3h in FIG. 2. Special function switch 136 is used to provide a surprise or special effect, such as a randomized response, and may be labeled SURPRISE. When closed, switch 136 causes the microprocessor IC 1 to access a randomizing algorithm resident in microprocessor ROM and randomly select and playback one of the seven sounds recorded in memory by causing its address to be applied to the appropriate address lines of the sound storage-and-playback device IC 2. Special function switch 136 is switch 3j in FIG. 2.

Finally, the apparatus 100 may additionally include an optional pitch slide switch 132 having three settings indicated by dots 133. The setting of switch 132 enables the playback of sounds stored in memory to be altered in pitch either under control of microprocessor IC 1 (under program control) or under user control. Pitch slide switch 132 is SW1 in FIG. 2.

Still referring to FIG. 1, what follows is a typical sequence of actions in which the reader will participate. After opening book 102 to present the first page 104 to the child, the child or an assisting older person will begin to read the introductory page. The latter may contain a short story line in which the reader is directed to move record slide switch 134 to the record position R and then to press specified touchbuttons SW-n (e.g., touchbuttons 130 of a certain color) in a certain sequence so as to enter the aforementioned functional code. These initial instructions will be followed by a request to place record switch 134 (switch 3h in FIG. 2) into the record position R. The following instructions will further guide the reader to begin the recording process by pressing in turn each of the seven colored touchbuttons 130a through 130g, one at a time, and speak specified words or make suggested sounds into microphone 10.

The text might direct the child to "say a name, . . . make a funny sound," "make an animal sound," "laugh," and so forth. Each time the child speaks or makes the sounds (presumably, but not necessarily, the sounds called for by the instructions), the microphone 5 will pick up his or her voice. This will signal the system microprocessor IC 1 that a recording is to be made, beginning with the initial syllable spoken by the child. Having switched the system to the record mode (either automatically or in response to record slide switch 134), the microprocessor IC 1 now directs the sound storage-and-playback device IC 2 to record these sounds for a given period of time (say, one second) and store them in memory. The specific steps taken by the microprocessor IC 1 and other electronic components of the system (e.g., IC 2) will be detailed below in conjunction with a description of the circuit diagram of FIG. 2.

Once the child has responded to all of the instructions on the introductory page 104 of book 102 and both the functional code and all of required sounds have been electronically stored in the system, the reader places record slide switch 134 in the playback position P and proceeds to the actual story line on the following pages 104 of book 102. Each time the text 106 is interrupted by a colored or otherwise identified symbol 107, such as a small colored square 108 printed in the gap between two words in the text 106, the reader or the child presses the similarly-colored or similarly-identified one SW-n of touchbuttons 130. The system will generally respond by reproducing one of the stored sounds or, alternatively, with additional sounds or sounds altered in pitch or volume or in their positional relationship, depending upon the functional code initially entered as described above, if such a feature is incorporated into the particular embodiment of the present invention. Alternatively, pitch-shifting during playback of one or more of the recorded sounds may also be controlled manually by switch 132.

Responses to pressing touchbuttons 130a through 130g during the course of reading the book will be:

a. In the basic operating mode, these sounds will correspond one-for-one with those recorded for touchbutton presses of the same color during the record mode described above.

b. In a second operating mode, the functional code-selected ROM-resident algorithms will randomize or otherwise reallocate the sounds which will be played back. Such a reallocation may affect all of the touchbuttons 130 so that, once the specified function switch 136 is actuated, the subsequent actuation of any of the touchbuttons 130a through 130g will result in a specifically altered relationship or an unpredictable one of the recorded sounds being played back until a new record mode of operation is selected. Alternatively, such a reallocation may be associated with only a single touchbutton (i.e., the SURPRISE or special function switch 136) so that pressing touchbutton 136 will result in the random-selection and playback of one of the stored sounds, thus surprising the reader, without varying the sounds later played back upon actuation of one of touchbutton switches 130a–130g.

c. In a third operating mode, which may be concurrent with either the first or second mode, the microprocessor may alter the pitch of the reproduced sound whenever a particular one of touchbuttons 130a–130g is pressed. Alternatively, a manual input means such as slide switch 132 may be used to alter the pitch up or down, as selected by the reader.

Enhancement of the pleasure derived from playing back sounds previously recorded and stored by the child may result from the alteration of the pitch of the prerecorded sounds so that they are played back with a substantially different character from those of the recorded sounds. This alteration of pitch may be under the reader's control in response to a related instruction in the text or in response to a touchbutton press or switch closure or it may be the result of ROM-stored algorithms utilized by the writer to automatically invoke one of several available options resident in ROM-stored algorithms.

The typical sequences described above illustrate the interaction between the child and the book during the preparatory phase, the recording phase and read-and-playback phase. As can readily be seen, this interactivity both entertains and stimulates the child into developing a deeper attachment to reading of this and other books.

Figure 2:
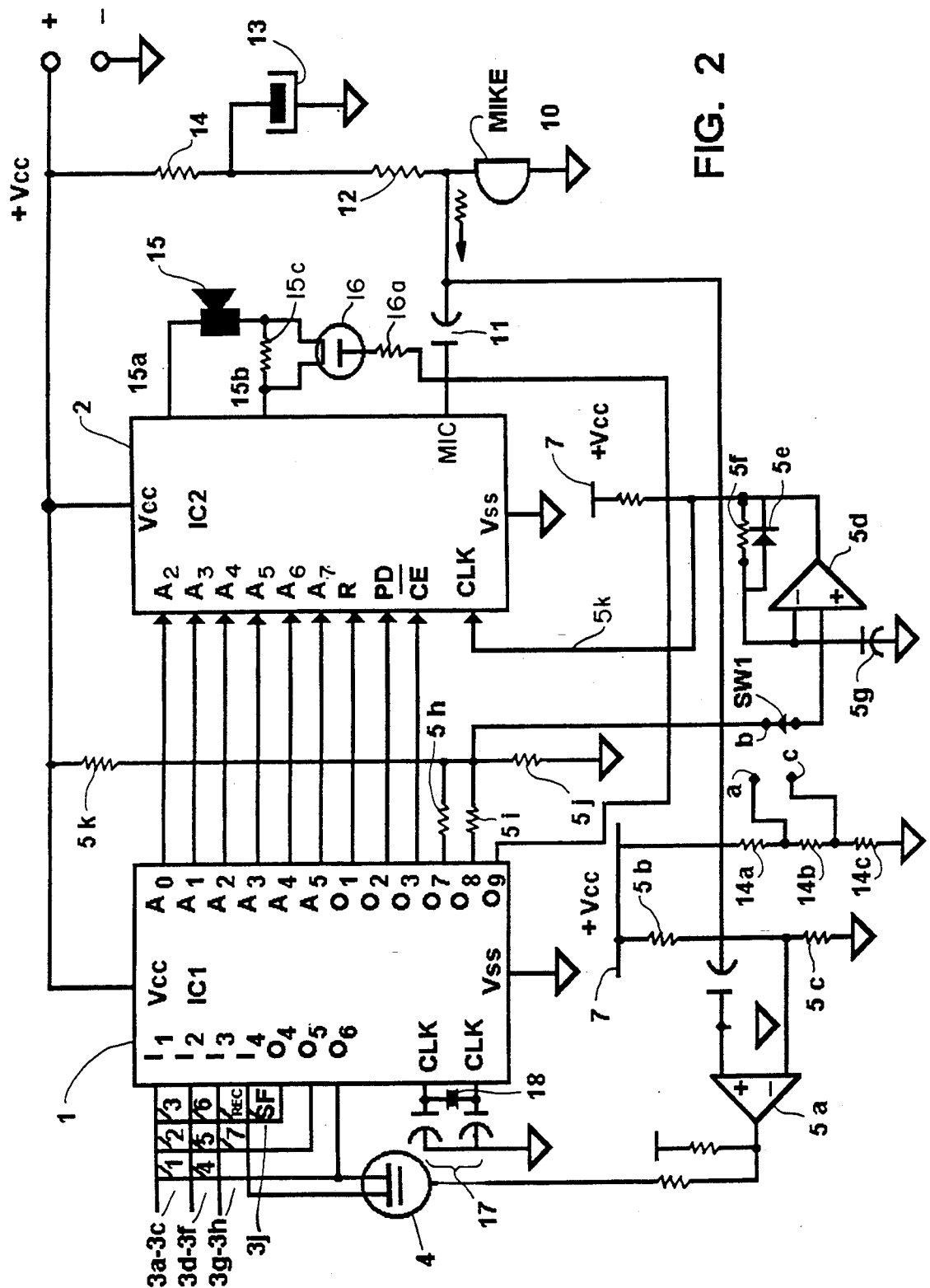
FIG. 2 is a circuit diagram of the electrical system.

Referring now to FIG. 2, therein illustrated is a circuit diagram for the electronic functions of the present invention. There are two major integrated circuit devices: microprocessor 1 (IC 1) and sound storage-and-playback device 2 (IC 2). The additional LM339-type comparator 5 and field-effect-transistors 4 (FET 4) and 16 (FET 16) constitute all of the active semiconductor components required by the basic system of the present invention.

The microprocessor IC 1 may be one of the low-cost 4-bit or 8-bit types currently in use in many electronic toys and games, such as the type COPS 413 available from National Semiconductor. The sound storage-and-playback IC 2 is preferably a random access memory device manufactured by Information Storage Devices, Inc. of San Jose, Calif., which stores audio-range signals in arrays of analog cells. Alternatively, sound signals may be digitized and stored in (digital) RAM during recording, and played back by delivering the RAM contents to a digital-to-analog converter, as is well-known in the art. The preferred ISD device IC 2 permits both recording and playback of sound-signals to be located in, and retrieved from, memory storage locations which can be accessed by setting up the appropriate 8-bit address on its eight input lines. The two least significant bit (LSB) addresses of IC 2 are tied to ground and not shown in FIG. 2; the six higher-order addresses are shown as lines A2 through A7. This arrangement allows the microprocessor IC 1 to play sound signals at minimum intervals of one-half of a second, the interval being a function of the IC 2. Microprocessor IC 1 controls these address-lines via outputs A0 through A5, as shown.

Output lines O1, O2 and O3 of microprocessor IC 1 control the PLAYBACK/RECORD function, the POWER-DOWN function and the CHIP-ENABLE functions of IC 2, respectively.

Turning now to the remaining input and output terminals of microprocessor IC 1 (located at the left side of the symbol for IC 1 in FIG. 2), these I/O terminals are served by switch matrix 3a through 3h and 3j. The seven switches 3a–3g are actuated with the seven touchbuttons areas 130a through 130g of FIG. 1. Switches 3h and 3j are, respectively, the record slide switch 134 and the special function touchbutton switch 136 of FIG. 1. Field Effect Transistor (FET) 4 is connected across a pair of I/O terminals of IC 1 and controlled by comparator 5a. It is turned on whenever sound signals reach microphone 10 whose positive peak excursions exceed the bias placed on comparator 5a by the divider resistors 5b and 5c. When this latter condition obtains, then comparator 5a turns on FET 4. If this occurs after record slide switch 134 is closed and one of touchbuttons 130a–130g is depressed, closing one of switches 3a through 3h, the operating program stored in the microprocessor's ROM starts the one-second record timing period referred to above and terminates the record function after the one-second interval is over. It is to be noted that the aforementioned one-second recording interval is cited only by way of example. Other periods of time may be used in any commercial embodiment of the present invention.

Microphone 10 is biased with several volts obtained from supply Vcc line 7. This bias voltage is applied through decoupling resistor 14 and load resistor 12. Capacitor 13 decouples microphone 10 from power supply noise signals. Capacitor 11 applies the output signal delivered by microphone 10 to the mike input terminal MIC of IC 2. During playback, IC 2 drives a small dynamic permanent magnet (PM) loudspeaker 15 which is connected to IC 2 terminals 15a and 15b.

Item 17 indicates the presence of a network of passive components for controlling the clock frequency of microprocessor IC 1 and thus the pitch of the sounds being played back. This network may be of the R-C type or may utilize a ceramic resonator 18, as shown.

Comparator 5d is an IC device which functions as a voltage-controlled R-C oscillator whose output frequency is determined by the values of resistor 5f and capacitor 5g as well as by the voltage level established at the positive input terminal of the comparator by divider resistors 5h, 5i, 5j and 5k. Resistors 5h and 5i may be pulled up to Vcc 7 or down to ground, i.e. zero volts, depending upon the condition of IC 1 outputs O7 and O8. The ROM-stored operating program in microprocessor IC 1 causes lines O7 and O8 to be HIGH when a higher-than-nominal clock frequency is desired. Under these operating conditions, stored speech-segments from sound IC 2 will be reproduced at a higher pitch than that of the original source signal. If resistor 5h is pulled LOW, then the nominal clock frequency is generated by comparator/oscillator 5d. This is the clock frequency used during recording, which is applied to clock input CLK of IC 2 by means of line 5k. Finally, when both resistors 5h and 5i are pulled LOW by their respective microprocessor output connections, then the clock frequency will be below nominal, causing the reproduced sounds to have a lower pitch than those of the original source signal.

When the vertically oriented slide switch 132 (FIG. 1) is in the neutral or middle position b, clock oscillator 5d is under control of the microprocessor IC 1 as described hereinabove. However, when switch 132 is manually set to either the higher or lower position a or c, the bias applied by the resistance network 14a, 14b, 14c will modify the frequency of oscillator 5d. Thus, when the switch 132 is set to position a, a fixed bias voltage will be applied by the resistance network 14a, 14b, 14c to cause the frequency of oscillator 5d to increase, thus shifting upwardly the pitch of the stored sound segments upon playback. On the other hand, when switch 132 is set to the lower position c, a lower bias voltage is applied to oscillator 5d to cause the frequency to be lowered, thus shifting downwardly the pitch of the stored sound segments upon playback.

Amplified sound signals are delivered by IC 2 directly to loudspeaker 15 through output lines 15a and 15b. Resistor 15c is connected in series with line 15b and lowers the volume produced by loudspeaker 15. Resistor 16a is connected to the gate of FET 16. When microprocessor IC 1 raises output line 09 HIGH, FET 16 turns on and causes resistor 15c to be effectively shorted out. This raises the amount of signal supplied to loudspeaker 15, thus increasing its volume. It can readily be seen that the use of two FET devices and two resistors of different values would allow the system to play back sounds at three different loudness levels; in this fashion, the system can reproduce sounds at nominal levels, at "whispering" levels and at "shouting" levels.

Figure 3A:
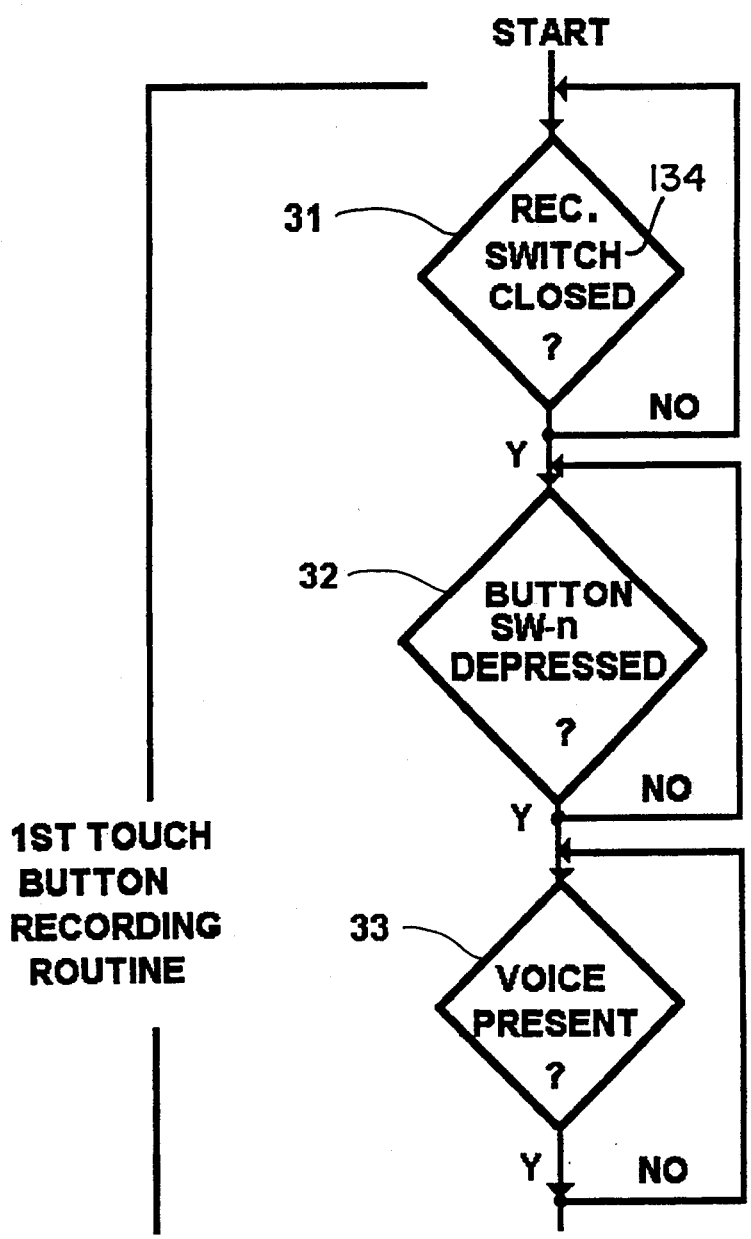
FIGS. 3A and 3B are flow charts showing the control steps taken by the apparatus microprocessor during the selected playback mode of operation.
Figure 3B:
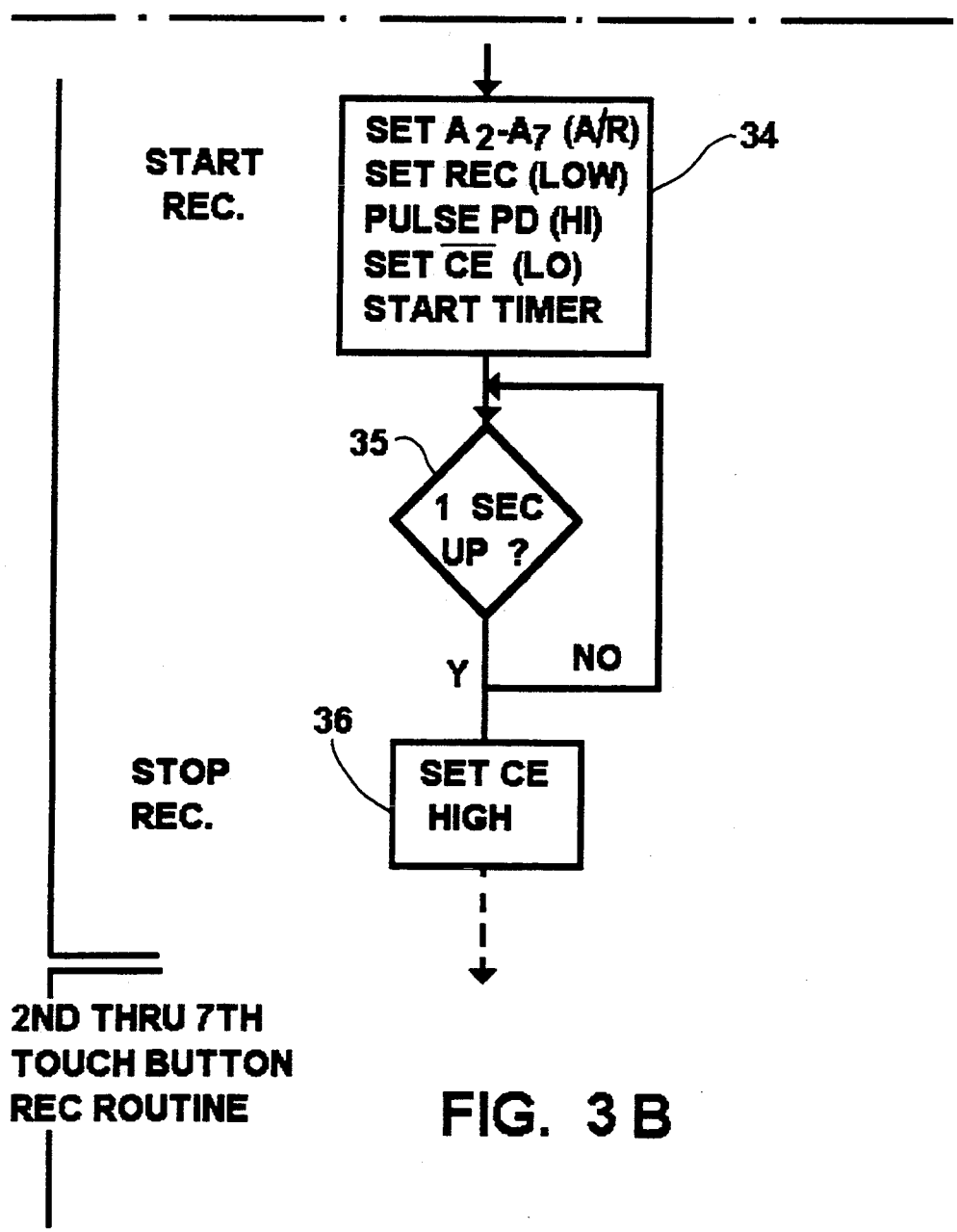

Referring now to FIG. 3A and 3B, therein illustrated are simplified flowcharts of the functional steps taken by the microprocessor IC 1 in the system of the present invention when the microprocessor has been signaled to place the system into the record mode. As described above, this occurs when the record slide switch 134 of FIG. 1 (controlling switch 3h of FIG. 2) is closed (i.e., moved to the R position) and when signal input is concurrently delivered by the microphone 10, thus turning on FET 4 (FIG. 2). (It will be noted here that in another embodiment of the present system (see FIG. 5), the microprocessor will automatically recognize when the RECORD mode is called for and does not require initiation by slide switch 134.) If present, these conditions are detected by the microprocessor IC 1 while it is polling its I/O terminals. This polling process goes on continually and is part of the ROM-based operating system.

A recording sequence begins with the sliding by the reader of the record slide switch 134 corresponding to switch 3h (see Diamond 31) to the record mode of operation R (thereby closing switch 3h ). The resultant switch closure is recognized by the microprocessor IC 1. The program then checks to see if a touchbutton switch 130 (SW-n on FIG. 2) has been selected (see Diamond 32) and, if not, waits for such a selection. After such a selection is made, the program then checks whether voice signals are present, i.e., whether there is output from the microphone 10 (see Diamond 33), and, if not waits for such sounds. When such sounds are detected, FET 4 conducts, thereby shorting the I/O terminals O6 and I4 to which it is connected.

The program now proceeds to set those of address lines A2–A7 HIGH as required (A/R) which correspond to the addresses assigned to the selected SW-n of the seven touchbuttons 130a–g. By way of example, this would cause the A3 line to go HIGH if the starting address were to be at the one-second starting location of IC 2. Next the program goes through a POWER DOWN (PD) cycle required by IC 2 to latch in the new addresses (see Block 34). Following that, the program causes the microprocessor to hold the CHIP ENABLE (CE) line LOW for exactly one second (see Block 34, Diamond 35 and Block 36). When this line goes HIGH, the recording function is terminated even though additional voice input may be present at the microphone 10. Readers must learn to fit their words or sounds into the required one-second time-slot or trailing parts of the sounds will be cut off.

The program now returns to monitoring the switch-closure of the record slide switch 134 and the simultaneous closure of another SW-n of the seven touchbuttons 130. When this is detected, the above-detailed program steps shown in the flowchart of FIG. 3A and 3B are repeated.

This concludes the description of program steps occurring during the record function of the system of the present invention.

Figure 4:
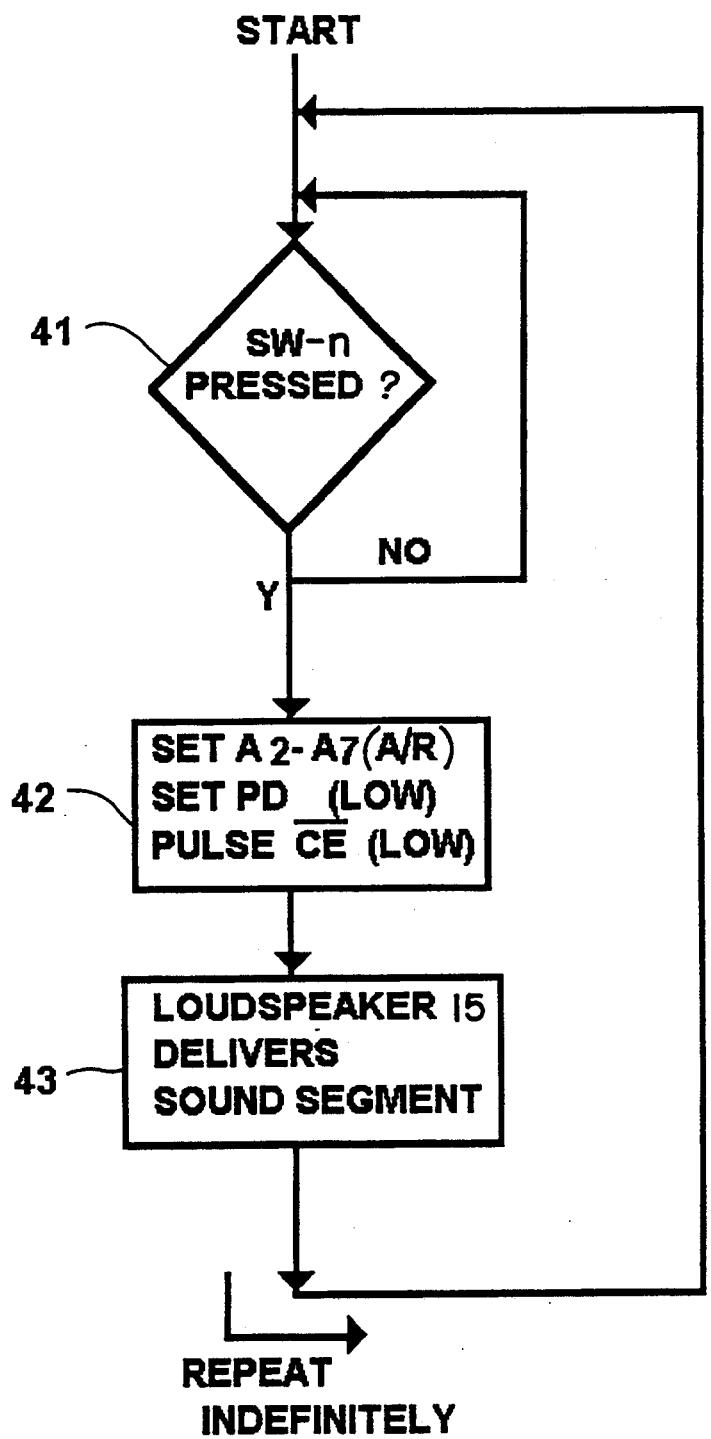
FIG. 4 is a flow chart showing the control steps taken by the apparatus microprocessor during the selected record mode of operation.

Referring now to FIG. 4, therein illustrated is a flowchart representative of what takes place during typical playback cycles. To enter the selected playback mode of operation, slide switch 134 (switch 3h of FIG. 2) is moved to the playback mode P (see FIG. 1). Playback is originated by pressing one SW-n of the seven colored touchbuttons 130 (corresponding to switches 3a–3g in FIG. 2), as instructed by the text of the book. Once the program has detected the presence of a particular touchbutton switch closure SW-n (see Diamond 41), it causes the microprocessor IC 1 to set the desired starting address lines A2–A7 HIGH as required (A/R) so as to determine which of the stored sound segments will be played back. Following that action, the POWER DOWN (PD) line is pulsed HIGH, thereby to insert the new address into sound chip IC 2. Finally, the CHIP ENABLE (CE) line is pulsed LOW to start delivery of the sound segment to the loudspeaker 15. Sound (see Block 42) is produced by the loudspeaker 15 and terminates at the end of one second (see Block 43); in the example given here; at that point, there is a 25 msec wide negative going pulse delivered by an output of sound IC 2 not shown in FIG. 2. This pulse may be utilized to inform the processor that sound has ceased in cases where the program calls for concatenating several sound segments.

If the special function touchbutton 136 is pressed (see FIG. 1), a random algorithm resident in ROM is accessed during Block 42 of FIG. 4. This algorithm will randomly deliver one of seven valid addresses to address lines A2 to A7. As a result any one of the seven stored sounds may be played back during this step. Alternatively, the apparatus 100 may be programmed so that pressing of special function touchbutton 136 does not itself cause the playback of any sound but merely the use of a new algorithm for associating a recorded sound (i.e., an addressable memory storage location) with a touchbutton SW-n. Thus when a touchbutton SW-n is then pressed, the sound which is played back may be any of the seven sounds recorded in connection with one of the touchbuttons 130. This type of randomized response to selection of a particular pushbutton 130 would continue until the apparatus were again placed in the record mode of operation R and new sounds were recorded and stored in the appropriate memory locations.

Figure 5:
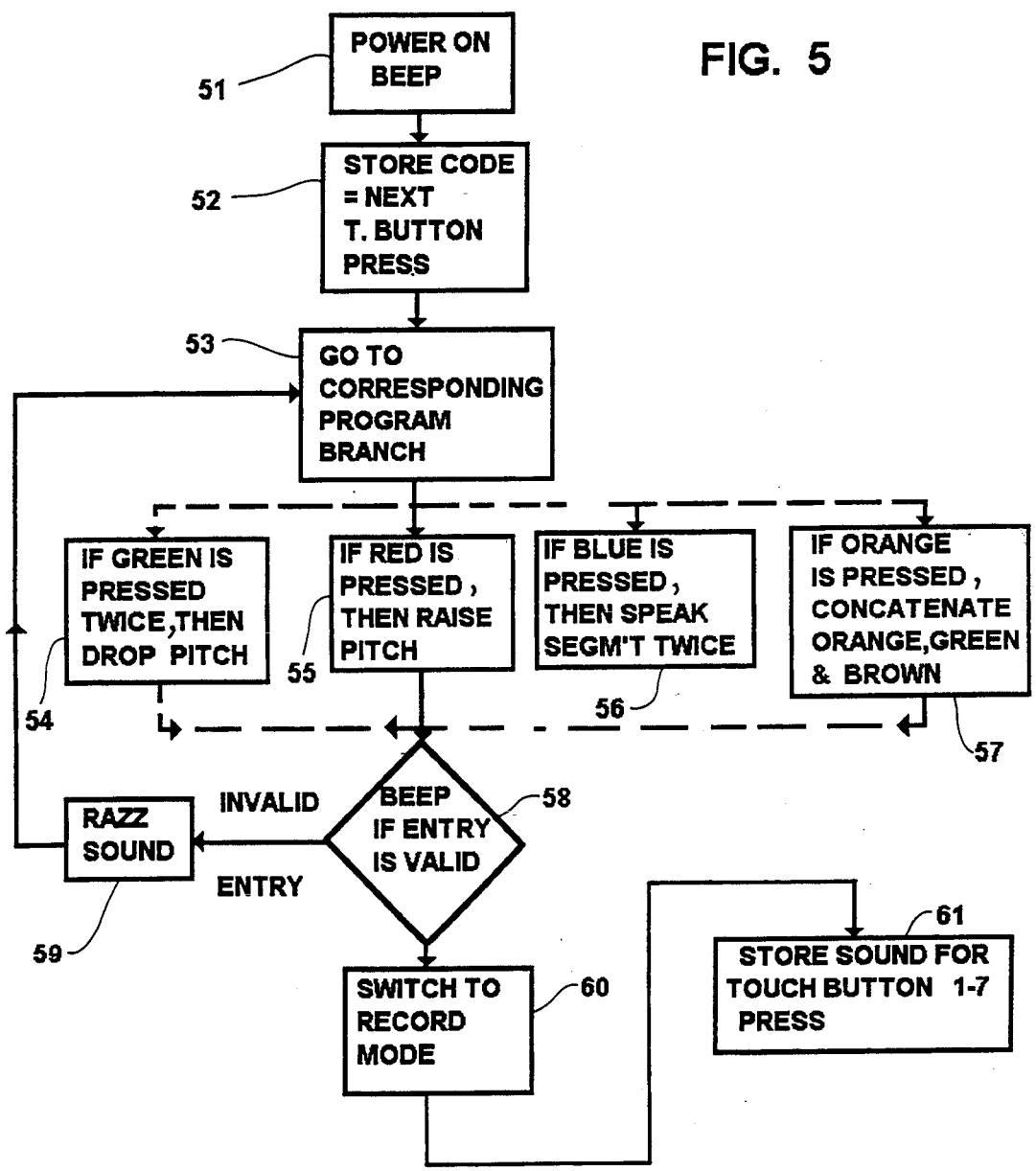
FIG. 5 is a flow chart showing the initial control steps taken by the apparatus microprocessor of a second embodiment before and during the selected record mode of operation.

Referring now to FIG. 5, therein illustrated is a flowchart representative of a second embodiment of the present invention which dispenses with pitch slide switch 132 and record slide switch 134 of the basic embodiment of FIG. 1. In this embodiment, all of the functions that may be assigned to these two switches are handled automatically under program control by the microprocessor.

The flowchart describes the procedure followed by the system microprocessor IC 1 after the electronic unit of the apparatus of the present invention is first turned on. POWER ON is confirmed by a beep delivered by IC 2 under program-control by the microprocessor IC 1 (see Block 51). This beep informs the reader that the system is ready for further inputs. The reader then keys in the functional code described on the introductory page of the story book. For example, he or she might be asked to press one of the RED, BROWN or GREEN touchbuttons 130. The microprocessor IC 1 stores this functional code and uses it to determine which of the algorithms shown in Blocks 54, 55 56 or 57) are applicable to this particular book (see Block 52). These four rules or algorithms are stored in a look-up table located in ROM along with their corresponding codes and numerous additional rules not cited here for the sake of brevity. Having fetched the appropriate algorithm in accordance with Block 53, the microprocessor then sets the related program variables such that the action indicated in Blocks 54, 55 56 or 57 occurs when presses of the specified colored touchbuttons 130 are executed by the reader.

For example, if the code caused Block 54 to be operative, then if the GREEN touchbutton is subsequently pressed twice in a row, the pitch of the reproduced sound resulting from the second button press will be delivered at a lower then normal pitch. Again by way of an example, if the code caused Blocks 55 to be operative, then if the RED touchbutton is subsequently pressed, the pitch of the reproduced sound is raised with respect to the pitch at which it was recorded. As a further example, if the code caused Block 56 to be operative, then if the BLUE touchbutton is subsequently pressed, the corresponding sound segment is reproduced twice, i.e., it is repeated. Finally, by way of example, if the code caused Block 57 to be operative, then if the ORANGE touchbutton is subsequently pressed, then the sound segments associated with the ORANGE, GREEN and BROWN touchbuttons are concatenated, i.e., played back sequentially, perhaps forming a short sentence or a longer sound sequence.

It will be appreciated that a particular functional code may select one or more algorithms for use, if desired.

After the related program variables have been set so that the rules of Blocks 54, 55, 56 and/or 57 are operable in response to specific colored touchbutton presses, a beep is sounded to indicate a valid entry thereof (see Block 58) or a razz sound is emitted to indicate an invalid entry (see Block 59), with the system then returning to Block 53 for a valid entry. After the sounding of the beep to indicate a valid entry, the apparatus is switched to the record mode (see Block 60) and commences to store sounds for each SW1-SW7 of the touchbutton selectors 130, for example, as illustrated in FIG. 3 (see Block 61). However, to expedite matters, the system may simply actuate each of the touchbuttons selectors SW1 . . . SW7 in turn with appropriate pauses therebetween for recording of the sounds produced by the user. The appropriate sound to be made by the user may be prompted by the microprocessor IC 1 causing the sound chip IC 2 to issue vocal prompts, such as "make a sound" or indicating which of the touchbutton selectors is active at a given instant (for example, by a flashing light adjacent such touchbutton switch SW-n).

It will be appreciated that in the embodiment of FIG. 5 the on/off switch itself (not shown) acts as a means for selecting between the recording mode and playback mode, and the apparatus 100 automatically selects the recording mode when the apparatus is initially turned on.

In a more sophisticated and hence more expensive embodiment, the microprocessor may be initialized and individualized during the act of attaching a particular book 102 to electronic apparatus 100. The book 102 may include on the portion of the cover inserted into the apparatus 100 a code (such as a digital code in the form of a printed bar code or a magnetic strip containing the encoded information which is sensed by a bar code reader in the apparatus 100) for selecting the particular algorithms stored in the microprocessor ROM which the writer wishes to use in the authoring of the story, thereby enabling the writer to produce the special effects described above. While this more sophisticated embodiment avoids any need for the reader to manually enter an initializing code into the microprocessor through the use of touchbuttons 130 (pursuant to instructions located at the beginning of the story book), it also requires mechanical/electronic code-reading means, thereby increasing its cost and complexity.

Figure 6A:
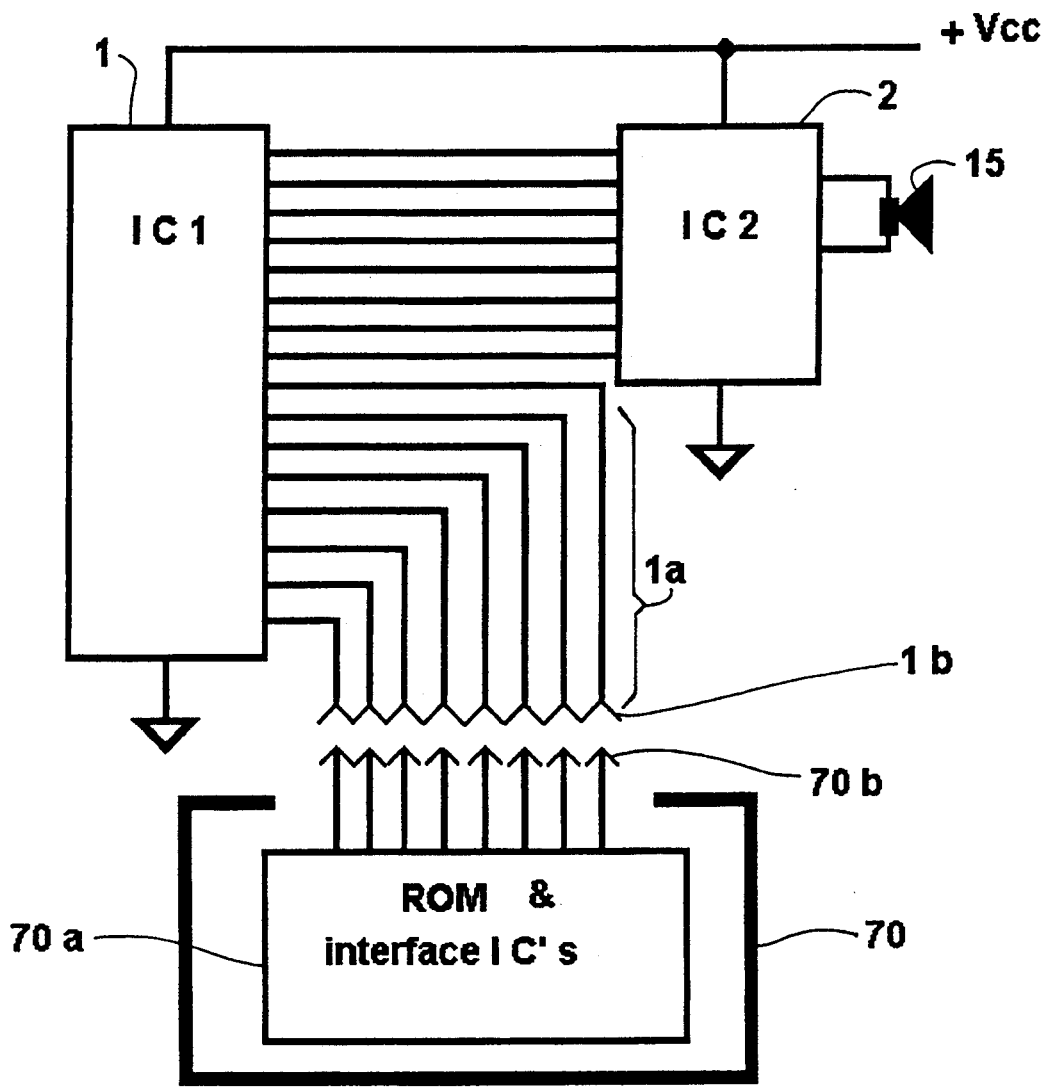
FIG. 6A is a simplified circuit diagram of an embodiment of the present invention having a plug-in-ROM module attached thereto.
Figure 6B:
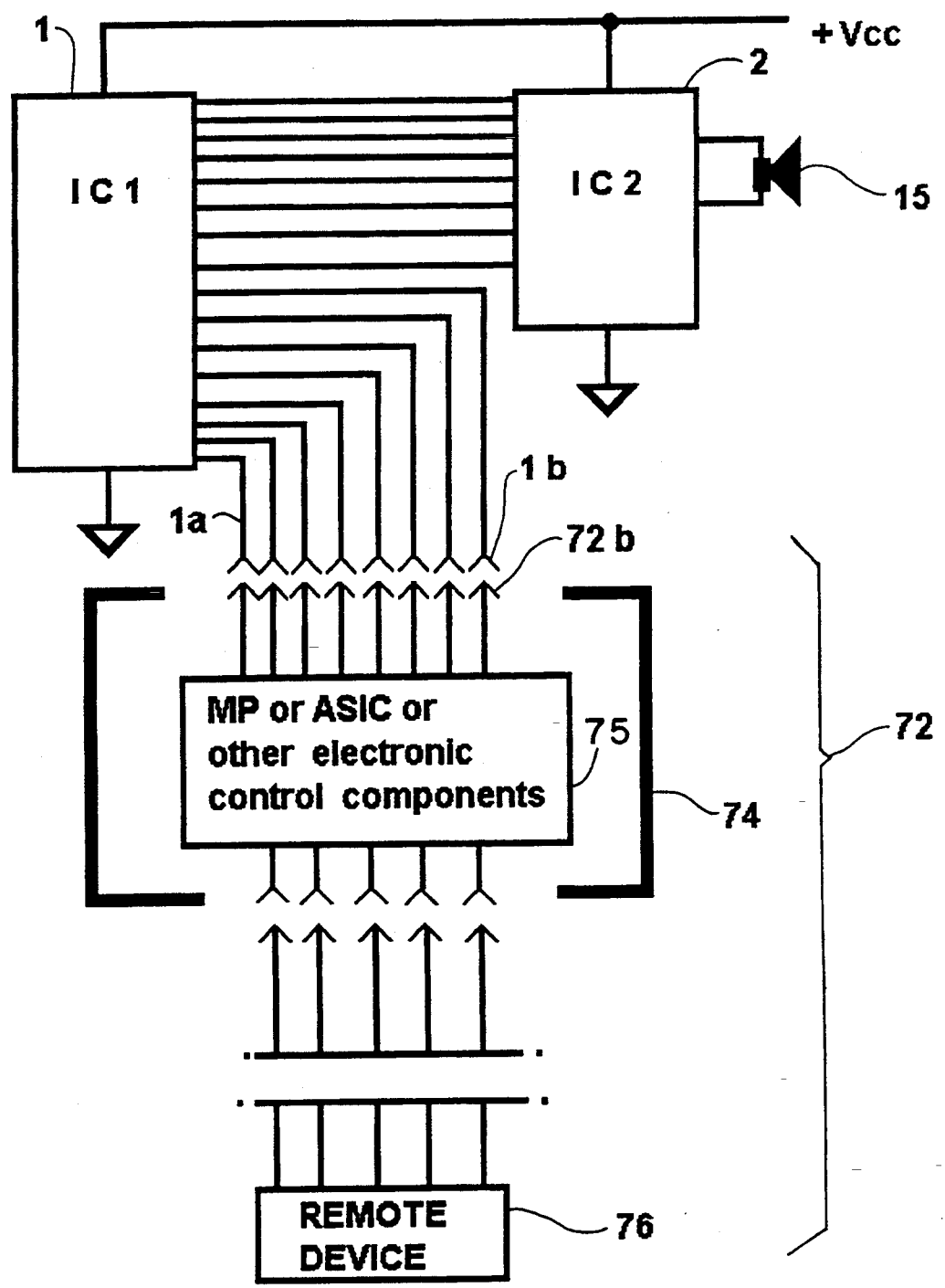
FIG. 6B is a simplified circuit diagram of a modified embodiment of the present invention having a plug-in auxiliary microprocessor and a remote device attached thereto.

FIGS. 6A and 6B are simplified schematic diagrams illustrating the extension of the previously described embodiments of the present invention to embodiments designed to allow the system to interface to external apparatus.

Referring now to FIG. 6A, this external apparatus is in the form of a plug-in-ROM cartridge 70 with a ROM-and-interface circuits 70a which can be connected to the I/O bus 1a of microprocessor IC 1 via connector means 1b and 70b in the manner of video-game plug-in-ROM game cartridges. The addition of an external ROM to the system of the present invention allows the system to become plug-in-programmable, thereby greatly increasing the capabilities of the system. For example, the additional ROM allows the storage of a large look-up table extending the number of acceptable input codes and their related functions, as detailed in connection with FIG. 5. Furthermore, the additional ROM allows storage and utilization of a large number of sound effects, musical tone sequences, voice messages and the like which can be used under processor control to signal actions to be taken by the reader, or, to provide a musical background related to the section of the book being read, again much in the manner of modern programmable video-games. These sounds are produced by microprocessor IC 1 and reproduced by the system speaker 15 via a multiplexing input on IC 2 (not shown).

In summary, use of the plug-in-ROM cartridge can greatly extend the capabilities of the basic apparatus. Use of such a cartridge, or the use of additional on-chip ROM built into microprocessor IC 1, provides great flexibility to the authors of story lines for this form of interactive children's books.

Referring now to FIG. 6B, the interface connections between system microprocessor 1 and its I/O lines la to external apparatus 72 and its interface 72a are similar to those of FIG. 6A. The external apparatus 72 includes two major elements: (a) electronic control unit 74 which contains microprocessor 75 or, alternatively, an ASIC or discrete component electronic circuitry; and (b) a remote device 76. Microprocessor 75 provides one-way or two-way communication and control to and from microprocessor IC 1 and to and from remote device 76. It may also contain some ROM (whether internally within the microprocessor 75, or externally by way of one or more ROM devices external to the microprocessor 75. Remote device 76 may be any apparatus, regardless of complexity, including an audio or video player for tape or compact disc.

By way of example, remote device 76 may be a simple light bulb which lights up under processor control as a function of predetermined algorithms resident in the ROM of either microprocessor IC 1 or microprocessor 75. As a further example, remote device 76 may be a motor which is turned on and off under program control. This motor, in turn, might drive pictorial displays or be part of an optical projector used to show slide-pictures related to the text being read and so forth. Alternatively, remote device 76 might be an infra-red transmitter directing digitally-encoded beams to still further external devices (not shown) to provide remote control for motorized vehicles, a small plastic airplane (whose motor-driven propeller is activated at appropriate points of the story line), and other forms of electronic toys. The latter may be sold either separately from the apparatus of the present invention or together therewith as a combination product.

By way of still another example, remote device 76 may be an audio tape player whose functions are under the control of microprocessor 75 and thereby allows turning the player on and off under program control of microprocessor IC 1 and thus permitting the delivery of additional sounds (including lengthy musical presentations) whenever the text of the book being read calls for such an audio accompaniment. This is readily achieved if the functional code entered into the system leads the system microprocessor IC 1 to appropriate elements in the look-up table referred to above. The resultant product derived from this embodiment of the present invention can be characterized as a novel form of the Book-and-Tape products currently popular with small children. The interaction between the main apparatus of present invention and the audio tape player 76 may introduce complementary voices, singing, instrumental music and the like into the reading process and thus greatly expands the scope of the interactive experience for the child reader.

Figure 7B:
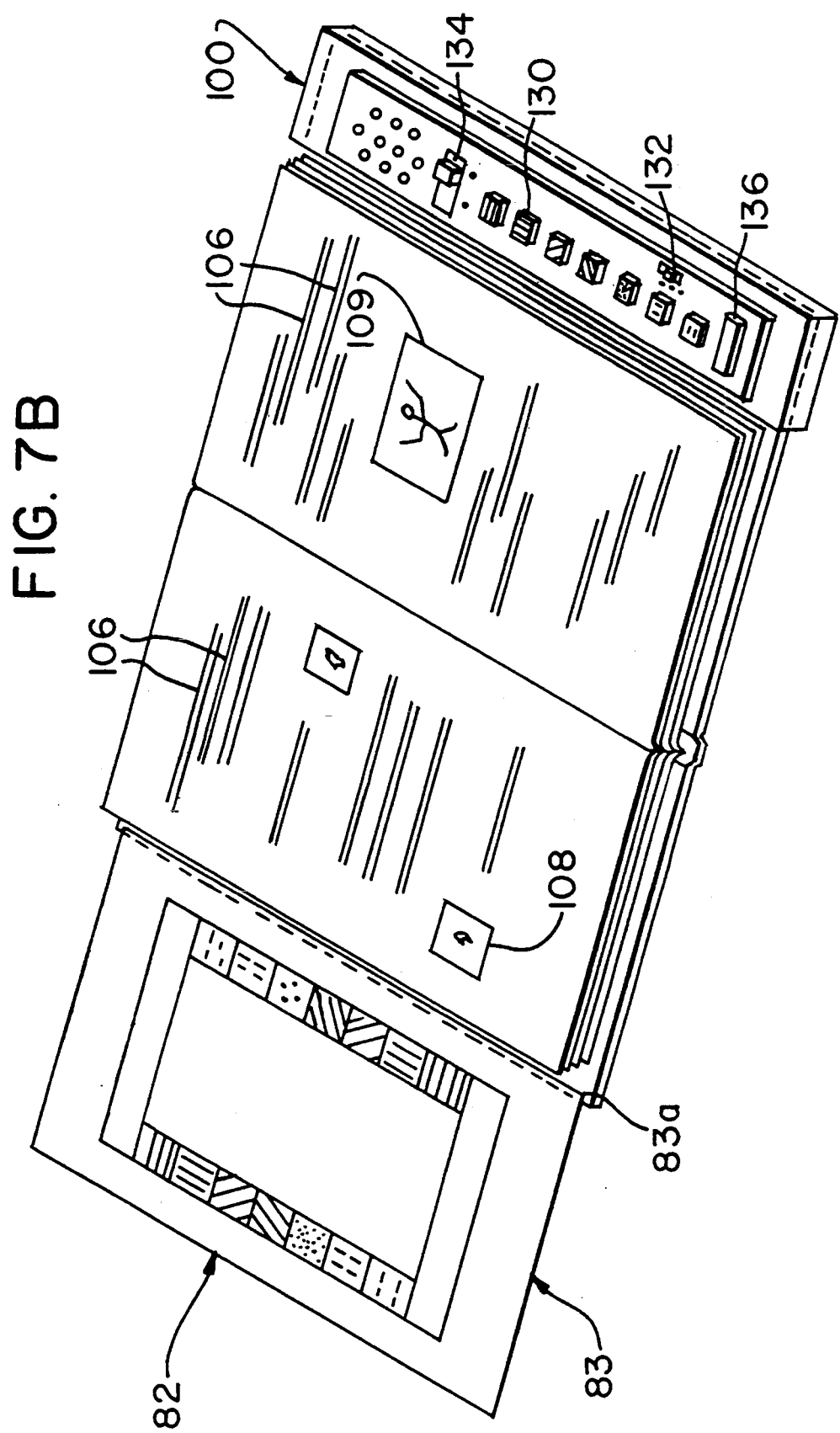
FIG. 7B is an isometric sketch of the apparatus used in connection with a puzzle book.

While the apparatus of the present invention has been described for use in conjunction with a reading book 102, clearly the principles of the present invention also apply when the apparatus is used in combination with a puzzle book 80 (as illustrated in FIG. 7A) or a game book 82 (as illustrated in FIG. 7B). For example, the puzzle book 80 may ask the reader to locate an elephant in a picture and then press the touchbutton 130 having a particular association therewith, such as the same color as the color of the elephant's trunk or a representation of an elephant's trunk thereon. The game book 82 of FIG. 7B is equipped with a fold-out gameboard 83 connected to book 82 by hinge 83a. Board game graphics 83b allow placing markers on board 82 in the manner of ordinary board games. Game rules determine the interaction between electronic unit apparatus 100 and the game. For example, landing a marker on certain spaces may call for pressing a similarly-colored touchbutton to obtain previously-recorded sound effects. Use of the capabilities of the electronic unit apparatus 100 and of the features and capabilities of the present invention allows the puzzles, quizzes or games to have different content and outcome each time they are replayed. This results primarily from the fact that the reader can store different sounds each time he or she replays the puzzle or game, and because both puzzles and games can be randomized via ROM-stored algorithms as is well-known in the electronic game art.

To summarize, the present invention provides apparatus for use in conjunction with a book which enables sounds produced by the user to be recorded prior to reading the book, so that the recorded sound segments can later be called up selectively and played back during reading of the book. The previously recorded sounds stored in the apparatus may be altered in pitch when played back and may be played back in a different order (e.g., in a random order) from that in which they were recorded and stored, with the previously recorded sounds being stored in the apparatus according to one logic rule and played back in response to a different logic rule (e.g., randomly).

To introduce still further entertainment or motivational variety into the process of reading a children's book, in one embodiment of the present invention a digital code is transmitted to the microprocessor during the act of mechanically attaching a particular book 102 to the electronic apparatus 100. This code may be in the form of a printed bar code used to invoke the particular ROM-stored algorithms which the writer wishes to use in the authoring of a story, thereby enabling the writer to produce the special effects described above. Alternatively, the reader may manually enter a code into the microprocessor by pressing one or more of the touchbuttons 130 in accordance with instructions located at the beginning of each storybook 102. This embodiment has the advantage of requiring no external mechanical or electronic code-reading means with their attendant cost and complexity.

The flexibility resulting from the above-mentioned features allows changing of many parametric relationships. Thus, it is possible, for example, to give multiple touchbutton presses a specific purpose (e.g., the concatenation of two stored sound segments so that short sentences can be "spoken"), or certain touchbuttons can be assigned still different functions at different times. This gives great flexibility to the writer of the story book insofar as it permits the writer to create scenarios that are fresh and different from book to book.

The variety of interactive effects achievable with the present invention may be increased still further if a microprocessor is chosen which can be interfaced to external ROM devices, thereby enabling the system to utilize plug-in cartridges containing ROM in the manner of plug-in-ROM programmable video games. A further extension of the capabilities of the present invention contemplates uses of the aforementioned interface of the microprocessor to control an external audio or video tape or CD player, thereby enabling the creation of forms of book-and-player embodiments of the present invention. Alternatively, the microprocessor may be used to control external electronic or electromechanical devices during the reading of the book where these devices have some relationship to the story line.

Additionally, the system of the present invention may be used with books containing puzzles and fold-out gameboards to further enhance the level of interactivity between the child reader and the system.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. Apparatus for use in conjunction with a book containing intermixed text and symbols, said apparatus comprising:

(A) a microprocessor;

(B) a randomly accessible sound storage-and-playback memory having addressable storage locations;

(C) a plurality of actuatable selectors, each selector being associated with a respective symbol corresponding to a symbol in the book;

(D) means for selecting between a recording mode of operation and a playback mode of operation;

(E) means for recording at respective addressable storage locations in said memory respective sounds produced by the user, said recording means being active during the selected recording mode of operation; and (F) means for playback from said memory of a respective recorded sound, said playback means being active upon actuation of a respective one of said selectors during the selected playback mode of operation.

2. The apparatus of claim 1 wherein said recording means is active, upon actuation of a respective one of said selectors during the selected recording mode of operation, for recording at a respective memory location the respective sound produced by the user.

3. The apparatus of claim 1 wherein said playback means, upon actuation of a respective one of said selectors in the selected playback mode of operation, plays back the sound recorded in a respective memory location.

4. The apparatus of claim 2 wherein the respective recorded sound played back upon actuation of said respective one selector in the selected playback mode of operation is generally the same respective sound previously recorded upon actuation of said respective one selector in the selected recording mode of operation.

5. The apparatus of claim 1 additionally including an actuatable frequency modifying means which, when actuated, modifies the pitch of the sound played back by said playback means so that it differs in frequency from the sound recorded in said memory.

6. The apparatus of claim 5 wherein said frequency modifying means includes a switch which is user-actuatable.

7. The apparatus of claim 5 wherein said frequency modifying means is actuatable under program control.

8. The apparatus of claim 1 wherein said recording means, upon actuation of a respective one of said selectors in the selected recording mode of operation, records the sound produced by the user in a respective memory location associated with said one selector.

9. The apparatus of claim 8 wherein said playback means, upon actuation of a respective one of said selectors in the selected playback mode of operation, plays back the sound recorded in a respective memory location associated with a different one of said selectors.

10. The apparatus of claim 8 wherein said playback means, upon actuation of respective one of said selectors in the selected playback mode of operation, plays back the sound recorded in a randomly selected one of said respective memory locations.

11. The apparatus of claim 9 additionally including means for determining according to a first algorithm the respective memory location where the sound produced during actuation of a given one of said selectors is recorded in the selected recording mode of operation, and according to a second algorithm the respective memory location from which the sound will be played back in the selected playback mode of operation upon actuation of said given one of said selectors.

12. The apparatus of claim 11 wherein said first and second algorithms determine the same memory locations.

13. The apparatus of claim 11 wherein said second algorithm determines a randomly selected one of said respective memory locations.

14. The apparatus of claim 11 additionally including an actuatable randomizing switch which, when actuated, causes said second algorithm to differ from said first algorithm and to randomly associate respective memory locations with respective selectors.

15. The apparatus of claim 11 additionally including an actuatable randomizing switch which, when actuated, causes said playback means to playback a randomly selected respective recorded sound from said memory.

16. The apparatus of claim 1 additionally including means for receiving functional codes.

17. The apparatus of claim 16 whereby said microprocessor operates according to at least one of a plurality of functional algorithms stored in said microprocessor according to the functional code received.

18. The apparatus of claim 17 wherein one of said algorithms causes a change in the pitch of said playedback sounds.

19. The apparatus of claim 17 wherein one of said algorithms causes a change in the volume of said playedback sounds.

20. The apparatus of claim 17 wherein one of said algorithms causes specific ones of said memory locations to be addressed sequentially during said selected playback mode of operation, thereby to concatenate playedback sounds from said specific memory locations.

21. The apparatus of claim 1 wherein one of said algorithms controls the relationship between said selectors and said respective memory locations during said selected playback mode of operation.

22. The apparatus of claim 1 wherein said microprocessor interprets as a functional code actuation of predetermined ones of said selectors during said selected recording mode of operation.

23. The apparatus of claim 1 wherein said recorded sounds remain in said respective memory locations despite temporary removal of power from said memory.

24. The apparatus of claim 1 wherein said respective sounds remain recorded in said respective memory locations until new sounds are recorded thereover in the selected recording mode of operation, thereby to enable multiple re-readings of the same text with the same sounds being produced in the selected playback mode of operation.

25. In combination, the apparatus of claim 1 and a children's reading book.

26. In combination, the apparatus of claim 1 and a game book.

27. In combination, the apparatus of claim 1 and a puzzle book.

28. In combination, the apparatus of claim 1 and an external ROM unit.

29. In combination, the apparatus of claim 1 and an external device operating under control of the apparatus.

30. Apparatus for use in conjunction with a book containing intermixed text and symbols, said apparatus comprising:

(A) a microprocessor;

(B) a randomly accessible sound storage-and-playback memory having addressable storage locations;

(C) a plurality of actuatable selectors, each selector being associated with a respective symbol corresponding to a symbol in the book;

(D) means for selecting between a recording mode of operation and a playback mode of operation;

(E) means for recording at respective addressable storage locations in said memory respective sounds produced by the user, said recording means being active upon actuation of a respective one of said selectors during the selected recording mode of operation;

(F) means for playback from said memory of a respective recorded sound, said playback means being active upon actuation of a respective one of said selectors during the selected playback mode of operation; and (G) microprocessor means for determining according to a first algorithm the respective memory location where the sound produced during actuation of a given one of said selectors is recorded in the selected recording mode of operation, and according to a second algorithm the respective memory location from which the sound will be played back in the selected playback mode of operation upon actuation of said given one of said selectors;

said respective sounds remaining recorded in said respective memory locations until new sounds are recorded thereover in the selected recording mode of operation, thereby to enable multiple re-readings of the same text with the same sounds being produced in the selected playback mode of operation.

* * * * *

UNITED STATES PATENT AND TRADEMARK OFFICE
CERTIFICATE OF CORRECTION

PATENT NO. : 5,437,552

DATED : August 1, 1995

INVENTOR(S) : Baer, et al.

It is certified that error appears in the above—identified patent and that said Letters Patent is hereby corrected as shown below:

Abstract Page, left column, change "Filed: Aug. 13, 1994" to

-- Filed: Aug. 13, 1993 --.

Signed and Sealed this

Ninth Day of July, 1996

Attest:

BRUCE LEHMAN

Attesting Officer     Commissioner of Patents and Trademarks